United States Patent [19]

Kaneko et al.

[11] Patent Number: 4,505,821

[45] Date of Patent: Mar. 19, 1985

[54] METHOD OF TREATING WASTE LIQUORS CONTAINING PHENOLICS AND FORMALDEHYDE

[75] Inventors: Yasuyuki Kaneko, Nagoya; Masao Ito, Anjyo; Yukio Ogura; Jiro Ishikawa, both of Hiratsuka, all of Japan

[73] Assignee: Nagoya University, Nagoya, Japan

[21] Appl. No.: 612,211

[22] Filed: May 21, 1984

[30] Foreign Application Priority Data

May 20, 1983 [JP] Japan .................... 58-87603

[51] Int. Cl.$^3$ .................... C02F 3/34; C12R 1/645
[52] U.S. Cl. .................... 210/611; 210/909; 435/254; 435/262; 435/911
[58] Field of Search ........... 210/611, 623, 615–618, 210/908, 909; 435/254, 262, 267, 911, 945

[56] References Cited

U.S. PATENT DOCUMENTS

| 4,211,645 | 7/1980 | Zajic et al. ............ 210/611 |
| 4,352,886 | 10/1982 | Pillis et al. ............ 435/262 |
| 4,371,440 | 2/1983 | Yoshizawa et al. ....... 210/611 X |
| 4,420,397 | 12/1983 | Kaneko et al. .......... 435/911 X |

Primary Examiner—Thomas Wyse
Attorney, Agent, or Firm—Sughrue, Mion, Zinn, Macpeak, and Seas

[57] ABSTRACT

Waste liquors containing phenolics and formaldehyde can quickly and economically be treated by a microorganism of genus Trichosporon to prevent water pollution.

9 Claims, 2 Drawing Figures

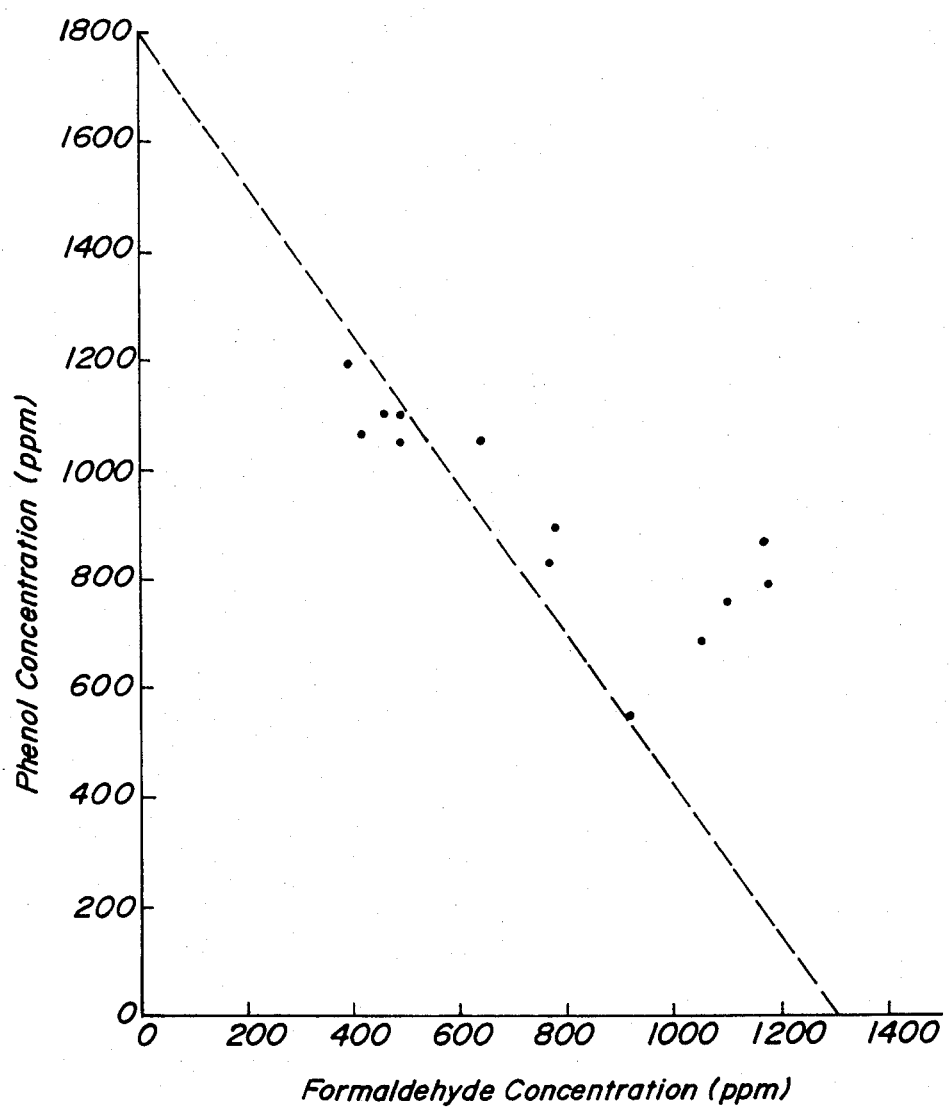
FIG_2 ature graph showing relations
METHOD OF TREATING WASTE LIQUORS CONTAINING PHENOLICS AND FORMALDEHYDE

BACKGROUND OF THE INVENTION

1. Field of the Invention

The present invention relates to a method of treating waste liquors containing phenolics and formaldehyde, particularly to a method of treating such waste liquors by a microorganism.

The term "phenolics" used herein means a compound or compounds selected from the group consisting of phenol, o-, m- and p-cresol, saligenine, o-, m- and p-hydroxybenzaldehyde, salicylic acid, catechol, 3-methylcatechol and 4-methylcatechol, etc.

2. Description of the Prior Art

Heretofore, waste liquors containing phenolics have been known which contain high concentration of formaldehyde in addition to high concentration of phenolics, such as waste liquors discharged from phenolic resin production plants and the like. Phenolics and formaldehyde have large adverse influences on biological treatment of such waste liquor due to their toxicities. A conventional process of treating such waste liquor is to dilute the waste liquor by using a large amount of dilution water or treat the waste liquor by a complicated physicochemical and/or chemical treatment to reduce their toxicities in the waste liquor, and thereafter treat the waste liquor of reduced toxicities by means of activated sludge method, as described in Japanese Patent Application laid-open No. 62,659/79. However, the method has drawbacks in that the use of a large amount of dilution water necessarily increases the amount of the waste liquor to be treated to an extremely large extent, that a cost of the dilution water is not always cheap but rather expensive, that the physicochemical and/or chemical treatment necessitates a large amount of chemicals, labours, work time and a large scale of apparatus, and that the activity of acclimated bacterium in the sludge is hardly maintained because they are weak to fluctuation in phenolics concentration of an influent waste liquor to be treated. From this reason, the inventors have formly proposed a method of treating waste liquors containing phenolics by removing phenolics by means of a microorganism of genus Aureobasidium and obtained Japanese Pat. No. 1,087,941, which was however not perfectly satisfactory.

SUMMARY OF THE INVENTION

An object of the present invention is to provide a method of treating waste liquors containing phenolics and formaldehyde, which achieves the following advantages of (1) considerably decreasing the amount of dilution water to be used, (2) minimizing the initial and running costs, (3) withstanding or durable to fluctuation in phenolics and formaldehyde concentrations of influent waste liquors, and (4) treating the waste liquors rapidly and economically in a considerably small apparatus.

Another object of the present invention is to provide a method of treating the waste liquors containing phenolics and formaldehyde, wherein a fungus is used which is excellently capable of decomposing and assimilating phenolics and formaldehyde and is able to propagate against the multiplicative adverse influences of the toxicities of high concentrations of phenolics and formaldehyde to sufficiently remove the same from the waste liquor.

The present invention is a method of treating a waste liquor containing phenolics and formaldehyde, comprising, culturing a fungus of genus Trichsporon which is capable of decomposing and assimilating high concentrations of phenolics and formaldehyde in the waste liquor to remove the same from the waste liquor.

Another objects and advantages of the present invention will become apparent from the ensueing descriptions of the specification and accompanying drawings.

BRIEF DESCRIPTION OF THE DRAWINGS

FIG. 2 is a graph showing relations between initial phenolics concentration and formaldehyde concentration in influent waste liquors which can be completely treated according to the present invention.

DETAILED EXPLANATION OF THE INVENTION

Figure 1:
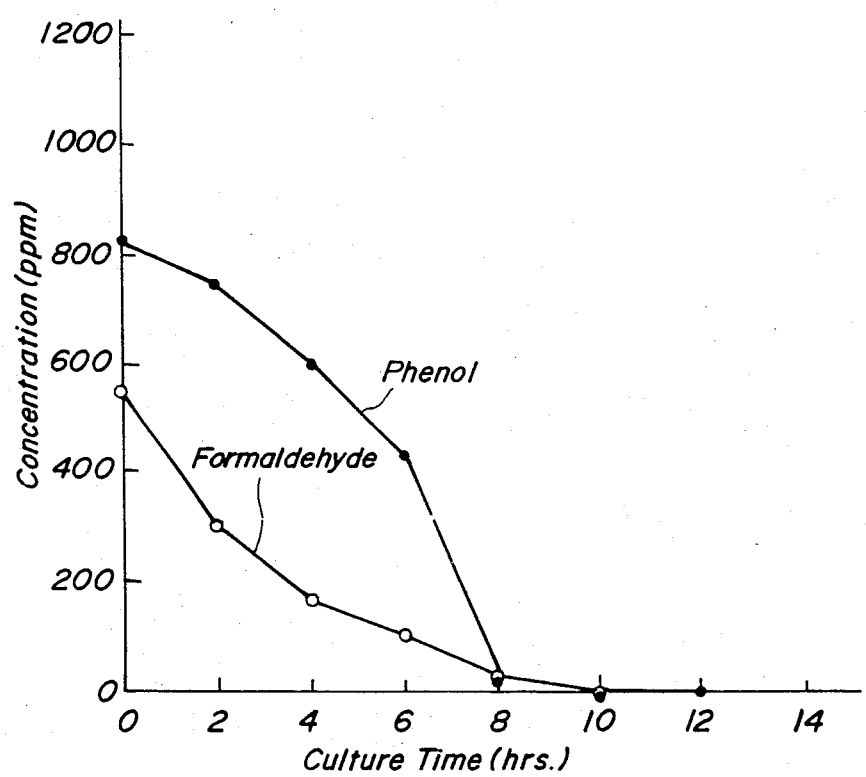
FIG. 1 is a characteristic graph showing relations between operation time and removals of phenolics and formaldehyde.

The present invention is different from the activated sludge method in that it does not use a bacterium and uses a fungus which has larger cell sizes than those of bacteria and still has a comparatively large surface area. Because bacteria have generally an intolerance to phenolics and formaldehyde while the fungus has strong ability of decomposing phenolics and formaldehyde, the present invention is far superior to the activated sludge method.

The fungus used in the present invention belongs to Eumycetes of genus Trichosporon and can decompose and assimilate high concentrations of phenolics and formaldehyde. The inventors have found out that the strain Trichosporon sp. No. 36 (hereinafter abbreviated as "present fungus") isolated from a soil sample has a particularly splendid ability of decomposing and assimilating phenolics as well as formaldehyde in the waste liquors. The present fungus was deposited to Fermentation Research Institute Agency of Industrial Science and Technology, Ministry of International Trade and Industry (abbreviated as "FRI") on Mar. 9, 1983 with international deposition No. FERM P-6977 under Budapest Convention. The present fungus has the following cultural characteristics.

Cultural Characteristics

Malt extract-peptone-yeast extract liquid culture: Fungal cells obtained after three days of culture at 30° C. were oval or cylindrical. Cell sizes were $(2.0-5.0) \times (4.0-12.0)\mu$, $(3.0-6.0) \times (7.0-19.0)\mu$. A few rings were formed on the surface of the culture liquid, and precipitates were formed at the bottom of the culture liquid.

Malt extract-peptone-yeast extract-agar culture: The growth was white or cream in colour. Raised and conical. Partially floccose moist colonies without luster were formed.

Corn meal-agar slide culture: Hyphae grew well. The hyphae were split into arthrospores of various lengths.

Improved Gorodokowa agar culture: Sporangium spores were not formed.

Gelatin culture medium culture: After 30 days of culture at 15° C., giant colonies of white or cream colour were observed. The central portion was partially floccose.

| Physiological properties | |
| --- | --- |
| Optimum temperature for growth | 25–30° C. |
| Temperature capable of growth | 12–35° C. |
| Optimum pH for growth | 5.5–7.0 |
| pH capable of growth | 3.0–9.5 |
| Assimilation and reduction of nitrate | None |
| Litmus milk test | No change |
| Osmophilic property (in 8% NaCl culture medium) | Yes |
| Liquefaction of gelatin | None |
| Require for vitamin | None |
| Decomposability of albutin | None |
| Production of starchy substance | None |
| Decomposability of fat | Yes |
| Assimilation of urea | Yes |

Fermentability: Ferments in glucose and galactose. pH value is decreased in glucose, galactose and L-sorbose.

Utilizability of carbonaceous sources: Glucose, galactose, L-sorbose, cellobiose, D-xylose, L-arabinose, D-arabinose, D-ribose, ethanol, glycerol, ribitol, D-mannitol, D-glucitol, succinic acid, citric acid, D-sorbitol, lactic acid, D-mannose, D-fructose, phenol, protocatechuic acid, pyrocatechol, galactitol, p-hydroxybenzoic acid are assimilated.

While, saccharose, maltose, trehalose, lactose, melibiose, raffinose, melezitose, inulin, soluble starch, L-rhamnose, erythritol, and α-methyl-D-glucoside and inositol are not assimilated.

The present fungus decomposes and oxidizes or assimilates vast varieties of many kinds of compounds. The present fungus can decompose and oxidize or assimilate phenolics of a concentration of about 3,000 ppm at the maximum in the waste liquor. Usually, waste liquors containing not more than about 1,800 ppm of phenolics, preferably of not more than about 1,300 ppm of phenolics, are treated. The present fungus can decompose and assimilate formaldehyde of a concentration of not more than about 1,300 ppm, preferably of not more than about 1,000 ppm. The present fungus can, of course, sufficiently assimilate phenolics of a concentration of about 300 ppm and formaldehyde of a concentration of about 100 ppm in the waste liquor.

The present fungus is classified to yeast which has a larger fungal cell size than usual bacterium, thus the fungal cell of the present fungus has better setting property than bacterium so that it can be easily separated in a sedimentation tank.

The present fungus can be grown even in an aerobic condition, so that it can be easily operated for treatment.

The present fungus propagates relatively quickly and easily assures necessary amount of fungal cells.

The present fungus provides sufficient treatment even at a concentration of 1/20 of concentration of usual culture medium (I culture medium).

The present fungus affords stable treatment by returning the fungal cells contained in the treated waste liquor into the treatment and utilizing them in the treatment.

The present fungus can withstand fluctuation of concentration of phenolics and formaldehyde in waste liquors. An illustrative example of treatment for such purpose is to use an air-permeable material such as nonwoven web or needle punched felt as a fixing bed for fungal cells. This treatment gives a stable treatment.

In treating waste liquors containing phenolics and formaldehyde, the present fungus is cultured at first to a large amount and the cultured large amount of fungus is acquired. For that purpose, there are two ways.

The first way is to culture the present fungus in a culture medium suitable for propagation thereof. Thus, in a culture medium containing a usual carbonaceous source such as glucose, saccharose, waste molasses or the like, the present fungus is cultured to a large amount and the large amount of fungus is acquired. In this case, the culture medium is additionally added with a nitrogen source, an inorganic substance and a minor nutrient which are optionally and properly selected from publicly known ones, upon request. Thus, as a nitrogen source, use is made of ammonium sulfate, ammonium nitrate, ammonium chloride or a mixture thereof. As an inorganic substance, use is made of magnesium salt, calcium salt, phosphate, sodium salt, iron salt, manganese salt or a mixture thereof. As a minor nutrient, use is made of yeast extract or the like. Alternatively, the present fungus is cultured at first in a natural culture medium which grow the present fungus well, such as malt extract-peptone-yeast extract culture medium (to be referred to as "MPY culture medium" hereinafter), malt extract-glucose-peptone culture medium, potato-glucose culture medium or the like, to acquire a large amount of fungal cells, and thereafter the fungal cells are imparted with a capability of decomposing and assimilating phenolics and formaldehyde for use in the aimed purpose.

The second way is to culture the present fungus in the culture medium of the first way wherein the carbonaceous source is substituted by phenolics and formaldehyde to a large amount, and acquire the large amount of fungal cells. According to this way, the fungus is originally imparted with a capability of decomposing and assimilating phenolics and formaldehyde, so that a time required to the fungus to acclimate with phenolics and formaldehyde is not necessary. However, according to this way, propagation of the fungus is delayed owing to toxicities of phenolics and formaldehyde, so that a prolonged period of culture of a large amount of fungus is sometimes required for obtaining a large amount of fungal cells.

The acquired large amount of fungal cells imparted with the capability of decomposing and assimilating phenolics and formaldehyde is used for treating waste liquors containing phenolics and formaldehyde. There are three methods for treating the waste liquors.

The first method is to suspend a large amount of fungal cells in the waste liquor preliminarily added with a suitable concentration of the above-mentioned culture medium in a tank equipped with an agitator and an air-dispersing device as in the treating tank of the activated sludge treating method, and agitate or air-ventilate the waste liquor for a short period of time so as to contact the fungal cells with phenolics and formaldehyde, thereby to decompose and assimilate phenolics and formaldehyde to remove the same from the waste liquor. After the decomposition and removal of phenolics and formaldehyde, the fungal cells are sedimentated, and the supernatant liquor is discharged to the exterior as a treated waste liquor. If desired, a precipitation tank for removing solid substances from the discharged liquor is provided to separate and remove fungal cells in the treated waste liquor from the waste liquor. Subsequently, the waste liquor containing phenolics and formaldehyde preliminarily added with the above-mentioned culture medium of a suitable concentration is passed into the tank so as to suspend the sedimentated fungal cells, and is air-ventilated or agitated for a short period of time so as to contact the fungal cells with phenolics and formaldehyde, thereby to decompose and assimilate phenolics and formaldehyde to remove the same from the waste liquor. Thus, the first method is a batch process wherein the above steps are sequential effected, which may be repeated a plurality of times for treating the waste liquor, if necessary.

The second method is a process wherein the batch process of the first method is continuously effected. Thus, the treatment is started by suspending a large amount of fungal cells in the waste liquor preliminarily added with a suitable concentration of the above-mentioned culture medium in a treating tank equipped with an agitator and an air-dispersing device as in the treating tank of the activated sludge treating method, and agitating or ventilating the suspension. After removal of phenolics and formaldehyde through decomposition and assimilation thereof has been accomplished to a certain extent in the tank, the waste liquor containing phenolics and formaldehyde is continuously fed into the tank at a constant rate to remove phenolics and formaldehyde through decomposition and assimilation thereof. In this case, a constant rate of the above-mentioned culture medium of a suitable concentration is continuously fed to the tank. Treated waste liquor is passed to a precipitation tank wherein it is separated from the fungal cells and discharged to the exterior. If desired, the separated fungal cells may be returned to the tank for treating the waste liquor so as to maintain the amount of the fungal cells in the tank at a constant ratio relative to the waste liquor.

The third method is a process wherein a large amount of fungal cells is adhered on a fixed bed for use in a continuous treatment. The present fungus can be propagated relatively well, so that there is no need of growing it in advance on a fibrous or porous support or substance. For effecting the method, a fixed bed made of an air-permeable material such as air-permeable nonwoven web or needle punched felt is preliminarily arranged in the same tank as used in the first and the second methods equipped with a ventilator and an agitator. As the first step, the present fungus is cultured in a culture medium which grows the present fungus well for about 1-2 days under ventilation and agitation in the tank having the fixed bed so as to fix the fungal cells on the fixed bed. As the second step, a waste liquor containing phenolics and formaldehyde is continuously fed to the tank at a constant feed rate to remove phenolics and formaldehyde therefrom continuously through decomposition and assimilation of phenolics and formaldehyde. In this case, an artificial synthetic culture medium of a suitable concentration is continuously fed into the waste liquor at a constant rate. Treated waste liquor is passed to a precipitation tank wherein it is removed from the fungal cells and discharged to the exterior.

For growing the present fungus to a large amount for treating a waste liquor, a temperature of 12°-35° C., preferably 25°-30° C., and a pH of 3-9.5, preferably 5.5-7.0 are maintained in the tank. Illustrative culture media suitable to the present fungus are malt extract-peptone-yeast extract culture medium (MPY culture medium) as a natural culture medium, and I culture medium as an artificial synthetic culture medium, which have the following compositions.

| Composition of MPY culture medium | |
|---|---|
| Malt extract | 30 g |
| Peptone | 5 g |
| Yeast extract | 0.1 g |
| Distilled water | 1,000 ml |
| Composition of I culture medium | |
| $NH_4NO_3$ | 5.0 g |
| $KH_2PO_4$ | 2.5 g |
| $MgSO_4.7H_2O$ | 1.0 g |
| NaCl | 0.1 g |
| Yeast extract | 0.1 g |
| $FeCl_3.6H_2O$ | 0.01 g |
| $CaCl_2.2H_2O$ | 0.01 g |
| $H_3BO_3$ | 0.5 mg |
| $CuSO_4.5H_2O$ | 0.01 mg |
| KI | 0.1 mg |
| $MnSO_4$ | 0.4 mg |
| $Na_2MoO_4.2H_2O$ | 0.2 mg |
| $ZnSO_4.7H_2O$ | 0.4 mg |
| Distilled water | 1,000 ml |

DESCRIPTION OF PREFERRED EMBODIMENTS

Hereinafter, the present invention will be explained in more detail which, however, should not be construed by any means as limitations of the present invention.

EXAMPLE 1

A slant of the present fungus is innoculated on 100 ml of MPY culture medium, cultured for 2 days at 30° C., subjected to centrifugal separation, and washed three times to obtain the present fungus. Thus obtained fungus is innoculated to 100 ml of I culture medium containing about 0.05% of phenol and about 0.05% of formaldehyde in a 500 ml flask, and cultured for 2 days at 30° C. After centrifugal precipitation, the present fungus is separated from the I culture medium for use as a seed fungus.

The seed fungus obtained from the above mass culture is innoculated to 100 ml of an artificial culture medium wherein phenol and formaldehyde are added to the I culture medium in a 500 ml of flask, and cultured at 30° C. to remove phenol and formaldehyde.

Initial concentrations of phenol and formaldehyde and concentrations thereof during the culturing step with elapse of time are measured by gas chromatography using a column of PEG20M type of Shimazu Seisakusho with respect to phenol, and according to a quantitative analysis method defined by JIS K 0102 "Method for Testing Plant Waste Liquors" as for formaldehyde. The results of treatment are as follows, which are also shown in the attached FIGS. 1 and 2.

Results of Treatment (1) Phenol was completely removed in about 8.5 hrs. Average treating rate was 96.2 mg/l·hour, and the maximum treating rate was 207.5 mg/l·hour.

Formaldehyde was completely removed in about 12 hrs. Average treating rate was 45.4 mg/l·hr, and the maximum treating rate was 122.5 mg/l·hour.

(2) Treatment results are shown in FIG. 1. As shown in FIG. 1, phenol and formaldehyde have shown simultaneous start of treatment. Phenol treating rate was gradually increased, while formaldehyde treating rate was large at the initial period of treatment wherein the concentration was high, and gradually reduced to small rate.

EXAMPLE 2

The process of Example 1 was repeated except that the phenol concentration and formaldehyde concentration were modified to various values. Results of treatment same as that of Example 1 in terms of phenol concentration and formaldehyde concentration after complete removal thereof are shown in FIG. 2. Waste liquors with the combinations of phenol concentration and formaldehyde concentration as shown in the following Table 1 were able to be treated for removal of phenol and formaldehyde therefrom.

TABLE 1

| Phenol concentration | Formaldehyde concentration |
|---|---|
| 1,190 ppm | 400 ppm |
| 1,100 | 470 |
| 1,095 | 495 |
| 1,065 | 425 |
| 1,050 | 500 |
| 1,050 | 645 |
| 890 | 785 |
| 855 | 1,190 |
| 825 | 775 |
| 785 | 1,190 |
| 750 | 1,110 |
| 675 | 1,060 |
| 540 | 925 |
| 1,520 | 200 |
| 300 | 1,100 |
| 400 | 1,000 |
| 500 | 950 |
| 600 | 870 |
| 1,650 | 100 |
| 200 | 1,200 |
| 1,700 | 50 |

Thus, according to the present invention, waste liquors containing phenolics and formaldehyde can be rapidly and economically treated in a stable manner.

Although the present invention has been explained with a certain degree of particularity, it is understood that the present disclosure has been made only by way of example and many variations and modifications are possible to those skilled in the art without departing from the broad aspect and scope of the present invention as defined in the appended claims.

What is claimed is:

1. A method of treating a waste liquor containing phenolics and formaldehyde, comprising culturing a fungus of Trichosporon sp. No. 36, FERM P-6977 which has a capability of decomposing and assimilating a high concentration of phenolics in the coexistence of a high concentration of formaldehyde, thereby to remove phenolics and formaldehyde contained in the waste liquor from the waste liquor.

2. A method as defined in claim 1, wherein the waste liquor contains about 300–1,800 ppm of phenolics.

3. A method as defined in claim 2, wherein the waste liquor contains about 300–1,300 ppm of phenolics.

4. A method as defined in claim 1, wherein the waste liquor contains about 100–1,300 ppm of formaldehyde.

5. A method as defined in claim 4, wherein the waste liquor contains about 100–1,000 ppm of formaldehyde.

6. A method of treating a waste liquor containing phenolics and formaldehyde, comprising acclimating and culturing a fungus of Trichrosporon sp. No. 36, FERM P-6977 which has a capability of decomposing and assimilating a high concentration of phenolics in the coexistence of a high concentration of formaldehyde in the waste liquor, mixing the acclimated cultured fungus with the waste liquor under aeration, thereby to remove phenolics and formaldehyde from the waste liquor.

7. A method of treating a waste liquor containing phenolics and formaldehyde, comprising preculturing a fungus of Trichlosporon sp. No. 36, FERM P-6977 which has a capability of decomposing and assimilating a high concentration of phenolics in the coexistence of a high concentration of formaldehyde to yield a large amount of said fungus, inoculating the precultured fungus on a fixed bed for fixing fungal cells of the fungus arranged in a tank for treating the waste liquor, acclimating and culturing the fungus in the waste liquor to fix the fungal cells on the fixed bed, contacting the waste liquor with the acclimated and cultured fungus fixed on the fixed bed under aeration to continuously treat the waste liquor, thereby to remove phenolics and formaldehyde from the waste liquor.

8. A method of treating a waste liquor containing phenolics and formaldehyde, comprising preculturing a fungus of Trichosporon sp. No. 36, FERM P-6977 which has a capability of decomposing and assimilating high concentration of phenolics in the coexistence of high concentration of formaldehyde to yield a large amount of said fungus, inoculating the precultured fungus on the waste liquor in a treating tank to acclimate with the waste liquor, mixing the acclimated fungus with the waste liquor under aeration to continuously treat the waste liquor, separating and returning at least a portion of fungal cells in the treated waste liquor exited from the treating tank to the waste liquor in the treating tank, thereby to remove phenolics and formaldehyde from the waste liquor.

9. A method as defined in claim 8, wherein total portion of the fungal cells exited with the treated waste liquor from the treating tank is returned to the waste liquor in the treating tank.

* * * * *